(12) United States Patent
Zhao

(10) Patent No.: US 7,536,648 B1
(45) Date of Patent: May 19, 2009

(54) METHOD FOR AUTOMATICALLY UPDATING GRAPHIC USER INTERFACE (GUI) OBJECTS

(75) Inventor: Nai Yan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,197

(22) Filed: Mar. 31, 2008

(51) Int. Cl.
*G06F 3/00* (2006.01)
*G06F 15/173* (2006.01)

(52) U.S. Cl. ............................ 715/762; 714/27; 714/39; 714/46; 717/116; 717/125

(58) Field of Classification Search ......... 715/762–765; 714/27, 38, 39, 46; 717/116, 125, 4
See application file for complete search history.

(56) References Cited

U.S. PATENT DOCUMENTS

| | | | | |
|---|---|---|---|---|
| 5,497,314 | A | | 3/1996 | Novak .......................... 364/403 |
| 5,581,634 | A | * | 12/1996 | Heide .......................... 382/226 |
| 5,600,789 | A | | 2/1997 | Parker et al. ........... 395/183.14 |
| 5,724,273 | A | * | 3/1998 | Desgrousilliers et al. .... 702/120 |
| 5,781,720 | A | | 7/1998 | Parker et al. ........... 395/183.14 |
| 5,983,001 | A | | 11/1999 | Boughner et al. ....... 395/183.14 |
| 6,067,639 | A | * | 5/2000 | Rodrigues et al. ............. 714/38 |
| 6,301,701 | B1 | * | 10/2001 | Walker et al. ................ 717/125 |
| 6,378,088 | B1 | * | 4/2002 | Mongan ....................... 714/39 |
| 6,725,399 | B1 | * | 4/2004 | Bowman ...................... 714/38 |
| 6,754,847 | B2 | * | 6/2004 | Dalal et al. ................... 714/27 |
| 7,006,693 | B2 | | 2/2006 | Shibuya ....................... 382/191 |
| 7,055,137 | B2 | * | 5/2006 | Mathews ..................... 717/125 |
| 7,165,240 | B2 | | 1/2007 | Patterson .................... 717/116 |
| 7,313,564 | B2 | | 12/2007 | Melamed et al. ............. 707/101 |
| 2006/0156287 | A1 | | 7/2006 | Vikram ........................ 717/124 |

FOREIGN PATENT DOCUMENTS

WO    WO 2007/118271    10/2007

OTHER PUBLICATIONS

Myers, "User Interface Software Tools" ACM Transactions on Computer-Human Interaction, vol. 2, No. 1, Mar. 1995, pp. 64-103.

* cited by examiner

*Primary Examiner*—Tadeese Hailu
(74) *Attorney, Agent, or Firm*—Zilka-Kotab, PC

(57) ABSTRACT

In one general embodiment, a method is provided. In operation, one of a plurality of object recognition methods is selected as a default object recognition method. Additionally, a test script is executed on an application. Further, it is detected whether the test script requires interaction with an object on a graphical user interface of the application. If the test script requires interaction with the object on the graphical user interface of the application, the default object recognition method is used to attempt to recognize the object on the graphical user interface of the application. If the object on the graphical user interface of the application cannot be detected with the default object recognition method, an alternate one of the plurality of object recognition methods is used to recognize the object on the graphical user interface of the application and recognition properties of the default object recognition method are updated to be able to recognize the object on the graphical user interface. Still yet, a result of the test script execution is output.

1 Claim, 2 Drawing Sheets

METHOD FOR AUTOMATICALLY UPDATING GRAPHIC USER INTERFACE (GUI) OBJECTS

BACKGROUND

The present invention relates to software, and more particularly, this invention relates to updating graphic user interface objects.

Software quality assurance (QA) is a very important part of the software development lifecycle because software QA contributes to assure software quality before the software is delivered to end customers. However, most software QA work is completed in a relatively primitive way. Most software QA engineers must manually click on or input data into an object on a graphic user interface (GUI) of an application under test (AUT) for each round of testing for QA. This is extremely time consuming and inefficient.

SUMMARY

In one general embodiment, a method is provided. In operation, one of a plurality of object recognition methods is selected as a default object recognition method. Additionally, a test script is executed on an application. Further, it is detected whether the test script requires interaction with an object on a graphical user interface of the application. If the test script requires interaction with the object on the graphical user interface of the application, the default object recognition method is used to attempt to recognize the object on the graphical user interface of the application. If the object on the graphical user interface of the application cannot be detected with the default object recognition method, an alternate one of the plurality of object recognition methods is used to recognize the object on the graphical user interface of the application and recognition properties of the default object recognition method are updated to be able to recognize the object on the graphical user interface. Still yet, a result of the test script execution is output.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method is provided. In operation, one of a plurality of object recognition methods is selected as a default object recognition method. Additionally, a test script is executed on an application. Further, it is detected whether the test script requires interaction with an object on a graphical user interface of the application. If the test script requires interaction with the object on the graphical user interface of the application, the default object recognition method is used to attempt to recognize the object on the graphical user interface of the application. If the object on the graphical user interface of the application cannot be detected with the default object recognition method, an alternate one of the plurality of object recognition methods is used to recognize the object on the graphical user interface of the application and recognition properties of the default object recognition method are updated to be able to recognize the object on the graphical user interface. Still yet, a result of the test script execution is output.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1:
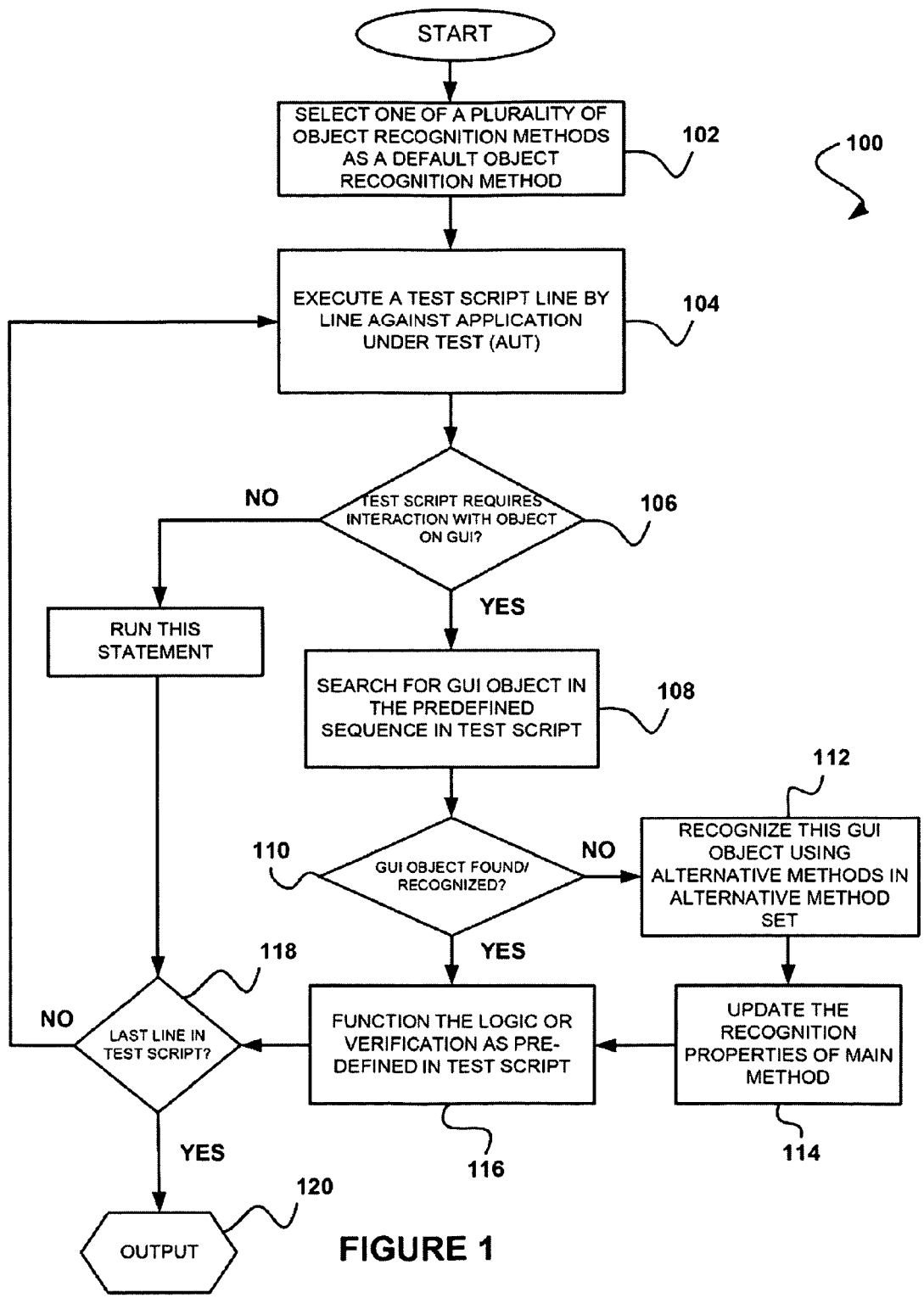
FIG. 1 shows a method for automatically updating graphic user interface (GUI) objects, in accordance with one embodiment.

FIG. 1 shows a method 100 for automatically updating graphic user interface (GUI) objects, in accordance with one embodiment. As shown, one of a plurality of object recognition methods is selected as a default object recognition method. See operation 102. In the context of the present description, an object recognition method refers to a method for recognizing objects. For example, the object recognition method may include a GUI object recognition method. In one embodiment, this GUI object recognition method may be a native GUI object recognition method.

Additionally, a test script is executed on an application. See operation 104. In this case, the test script may be executed on a line by line basis using the default object recognition method.

Further, it is detected whether the test script requires interaction with an object on a graphical user interface of the application. See operation 106. As an option, a search may be performed for the object in the test script. See operation 108. If the test script requires interaction with the object on the graphical user interface of the application, the default object recognition method is used to attempt to recognize the object on the graphical user interface of the application. See operation 110.

If the object on the graphical user interface of the application cannot be detected with the default object recognition method, an alternate one of the plurality of object recognition methods is used to recognize the object on the graphical user interface of the application and recognition properties of the default object recognition method are updated to be able to recognize the object on the graphical user interface. See operations 112 and 114. The logic or verification may then be executed as pre-defined in the test script. See operation 116. Once all of the lines in the test script have been executed, or an output is desired, a result of the test script execution is output. See operations 118 and 120.

In this way, recognition properties of a GUT object may be updated while allowing the use of different object recognition methods for GUT objects. Thus, native properties of the GUI object may be maintained. Furthermore, a group of methods, whose recognition properties are orthogonal may be utilized. In this case, the methods may work independently but ortho-complemental. In addition, an alternative method may be selected and utilized when the original method fails to work. Still yet, object recognition properties for that original method may be re-created.

Figure 2:
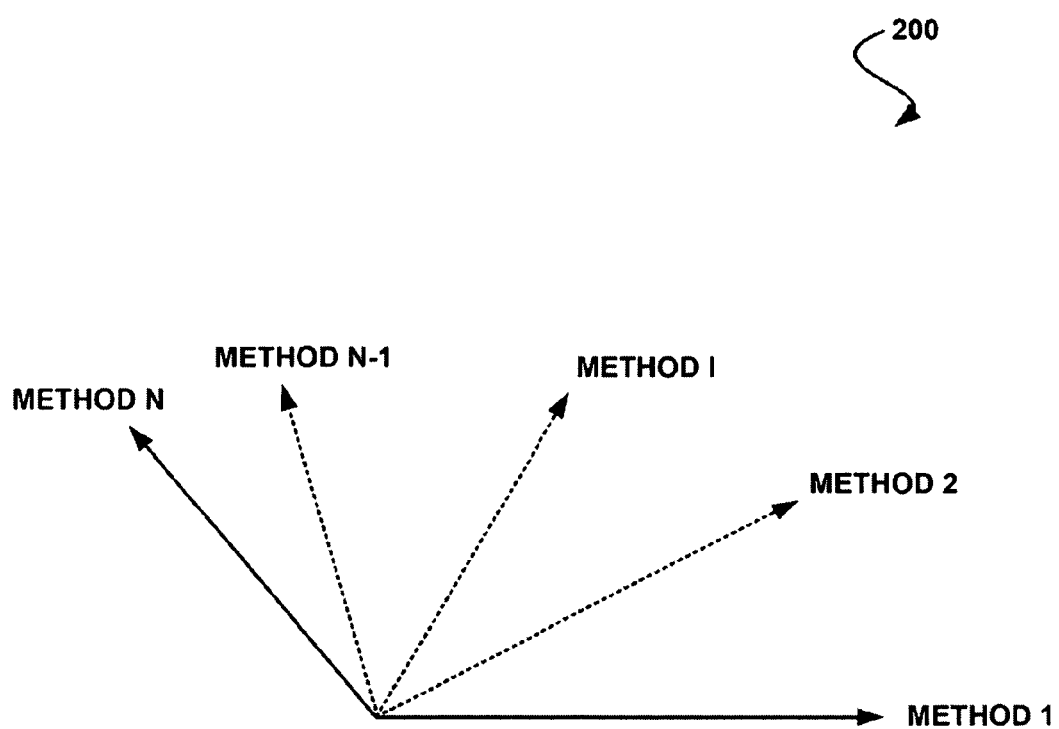
FIG. 2 illustrates an example of an n-dimensional space for a GUI object recognition method, in accordance with one embodiment.

In one embodiment, a GUI object recognition method may be view as a combination of recognition properties. For example, in an n-dimensional space, n axes of the GUI object recognition method are identified as Methods 1–n. FIG. 2 illustrates an example of an n-dimensional space 200 for the GUT object recognition method, in accordance with one embodiment. If for any method "I," there may be a combination of 1 or multiple methods in the set of methods (e.g. $Method_1, Method_2, \ldots, Method_{I-1}, Method_{I+1}, \ldots, Method_n$) to be an alternative method capable of working with the same output as method "I." In this case, Method 1–n are said to be orthogonal.

It should be noted that, the invention can take the form of an embodiment containing both hardware and software elements. In one embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk–read only memory (CD-ROM), compact disk–read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    selecting one of a plurality of object recognition methods as a default object recognition method;
    executing a test script on an application;
    detecting whether the test script requires interaction with an object on a graphical user interface of the application;
    if the test script requires interaction with the object on the graphical user interface of the application, use the default object recognition method to attempt to recognize the object on the graphical user interface of the application;
    if the object on the graphical user interface of the application cannot be detected with the default object recognition method:
        use an alternate one of the plurality of object recognition methods to recognize the object on the graphical user interface of the application; and
        update recognition properties of the default object recognition method to be able to recognize the object on the graphical user interface; and
    output a result of the test script execution.

* * * * *